United States Patent
Zelikov et al.

[11] Patent Number: 5,887,692
[45] Date of Patent: Mar. 30, 1999

[54] HYDRAULIC PRESSURE CYLINDER WITH COMBINED BOOT AND SPRING

[75] Inventors: Alexander Zelikov, Farmington; James V. Ludwig, Jr., Shelby Township, both of Mich.

[73] Assignee: Automotive Products (USA), Inc., Auburn Hills, Mich.

[21] Appl. No.: 781,390

[22] Filed: Jan. 10, 1997

[51] Int. Cl.[6] .................................................. F16D 47/00
[52] U.S. Cl. .................. 192/91 R; 192/91 A; 192/85 C; 192/85 CA; 74/18.2
[58] Field of Search ................ 192/91 R, 91 A, 192/85 CA, 85 C; 74/18.2

[56] References Cited

U.S. PATENT DOCUMENTS

| | | | |
|---|---|---|---|
| 2,544,328 | 3/1951 | Keroes | 74/18.2 X |
| 3,815,713 | 6/1974 | Dietrich | 192/91 R X |
| 4,235,427 | 11/1980 | Bialobrzeski | 267/292 X |
| 4,454,632 | 6/1984 | Nix et al. | 24/16 PB |
| 4,482,040 | 11/1984 | Brandenstein et al. | 192/91 A X |
| 4,551,976 | 11/1985 | Nix et al. | 60/533 |
| 4,557,361 | 12/1985 | Nix et al. | 192/85 C |
| 4,585,106 | 4/1986 | Shirley | 192/85 CA |
| 4,585,107 | 4/1986 | Monstevens | 192/85 CA |
| 4,665,802 | 5/1987 | Barker et al. | 92/23 |
| 4,766,804 | 8/1988 | Barker | 92/23 |
| 4,831,916 | 5/1989 | Monstevens et al. | 92/129 |
| 5,002,169 | 3/1991 | Barker | 192/85 C |
| 5,009,299 | 4/1991 | Seegers | 192/85 C |
| 5,267,637 | 12/1993 | Wilbur et al. | 192/85 CA |
| 5,598,910 | 2/1997 | Moroto et al. | 192/91 R X |

FOREIGN PATENT DOCUMENTS

| | | |
|---|---|---|
| 0 470 823 A2 | 8/1990 | European Pat. Off. . |
| 2510688 | 7/1982 | France . |
| 195 18 833 A1 | 5/1995 | Germany . |
| 2 251 911 | 7/1992 | United Kingdom . |
| 2 281 942 | 3/1995 | United Kingdom . |
| 2 293 217 | 3/1996 | United Kingdom . |

*Primary Examiner*—Charles A. Marmor
*Assistant Examiner*—Scott Lund
*Attorney, Agent, or Firm*—Young & Basile, P.C.

[57] ABSTRACT

A slave cylinder particularly suited for use in a hydraulic clutch release system for a motor vehicle. The cylinder includes a spring boot which serves as both a dust boot and a preload spring device. In one embodiment of the invention, the cylinder is an external slave cylinder and the spring boot extends from a rear end of the cylinder body to a rear end of the pushrod and acts to apply a preload force through the pushrod and through the release lever to the release bearing while simultaneously precluding the entry of dust and other contaminants into the interface between the piston and the cylinder bore. In another embodiment of the invention, the slave cylinder is a concentric slave cylinder and the spring boot is positioned in surrounding relation to the main body of the cylinder housing with the front end of the spring boot bearing against a flange portion of the housing and the rear end of the spring boot bearing against the non-rotating race of the release bearing so that the spring boot exerts the desired preload directly on the release bearing and simultaneously precludes the entry of contaminants into the interface between the housing and the annular piston. The front and rear ends of the boot define annular toothed configurations for respective mating coaction with annular toothed configurations on the flange portion of the housing and on the non-rotating race of the bearing whereby to preclude rotation of the non-rotating race induced by rotation of the rotating race.

15 Claims, 4 Drawing Sheets

HYDRAULIC PRESSURE CYLINDER WITH COMBINED BOOT AND SPRING

BACKGROUND OF THE INVENTION

This invention relates to hydraulic pressure cylinders and more particularly to a hydraulic slave cylinder especially suitable for use in a motor vehicle clutch release system.

A hydraulic clutch release system typically consists of a clutch, a release bearing, a release lever, a slave cylinder, and a master cylinder operated by a clutch pedal.

It is desirable that free play between the clutch release bearing, release lever and slave cylinder be eliminated to achieve good efficiency. This is normally achieved by providing a preload spring in the slave cylinder.

It is further desirable to preclude the entry of dust or other contaminants into the interface between the piston bore of the slave cylinder and the piston. This is normally achieved by providing a pleated elastomeric boot positioned in surrounding relation to the bore/piston interface.

It is further desirable to preclude rotation of the piston in the bore of the slave cylinder. Such rotation is introduced, for example, by the rotational force exerted on the stationary race of the release bearing by the rotating race of the release bearing.

SUMMARY OF THE INVENTION

This invention is directed to the provision of a simplified pressure cylinder.

More specifically, this invention is directed to the provision of a simplified pressure cylinder which is especially suitable for use as the slave cylinder in a motor vehicle clutch release system.

The invention relates to a clutch release system of the type including a cylinder body, a bore defined by the cylinder body, a piston slidably mounted in the bore, a clutch release bearing, a spring device providing a spring preload acting against a release bearing, and a boot protecting the interface between the piston and the bore.

According to the invention, the spring device and the boot are both constituted by an annular imperforate spring device positioned exteriorly of and in concentric relation to the bore, connected at a front end thereof to the cylinder body, positioned in surrounding relation to the piston/bore interface to preclude the entry of contaminants into the interface and operative via a rear end thereof to apply a spring load to the release bearing.

This arrangement simplifies the construction of the pressure cylinder by combining the spring and boot functions into a single part to thereby eliminate a major component of the pressure cylinder.

According to a further feature of the invention, the spring device comprises a pleated boot of elastomeric material. This specific construction simplifies the provision of the combined spring and boot and minimizes the cost of the combined part.

According to a further feature of the invention, the pressure cylinder comprises an external slave cylinder; the clutch release system further includes a push rod and a release lever; the push rod has a forward end associated with the piston and projecting out of the open rear end of the bore to position a rear end of the push rod rearwardly of the rear end of the bore; the rearward end of the push rod coacts with the release lever to act against the release bearing; and the annular imperforate spring device is positioned in surrounding relation to the rear end of the push rod and is connected at the rear end thereof to the rear end of the push rod. This specific construction provides an external slave cylinder for a clutch release system where the construction is simplified by combining the functions of the preload spring and the protective boot. Further, the positioning of the preload spring device externally of the bore, rather than in the bore between the closed front end of the bore and the front end of the piston, facilitates the use of a full base cup seal totally covering the front end of the piston since the cup seal need not provide an anchor point for one end of the spring as would be the case if the spring were located in typical fashion within the bore of the cylinder between the piston and the closed end of the bore.

According to a further feature of the invention, the pressure cylinder comprises a concentric slave cylinder; the cylinder body defines an annular bore; the piston has an annular configuration sized to fit slidably in the annular bore; and the annular imperforate spring device is positioned in surrounding relation to the cylinder body and acts at the rearward end thereof against the release bearing. This arrangement allows the feature of combining the spring device and the dust boot to be employed in a clutch release slave cylinder of the concentric type.

According to a further feature of the invention, the annular imperforate spring device comprises a pleated boot; the pleated boot includes a front flange having a front annular face and a rear flange having a rear annular face; the front annular face of the front flange defines an annular toothed configuration; the cylinder body surface against which the front end of the pleated boot bears defines an annular toothed configuration for mating coaction with the toothed configuration on the front annular face of the front flange of the boot; the rear annular face of the rear flange defines an annular toothed configuration; and the surface of the release bearing against which the rear end of the boot bears defines an annular toothed configuration for mating coaction with the toothed configuration on the rear annular face of the rear flange of the boot. This arrangement allows the boot to also serve as an anti-rotation device to preclude rotation of the piston in response to bearing rotation.

In the disclosed embodiment of the concentric slave cylinder, the release bearing includes an inner stationary race and an outer rotating race; the inner race is mounted on a rear end of the piston; and the rear end of the spring device acts against the inner race of the release bearing. This specific construction facilitates the provision of the combined preload spring and boot device in the environment of a concentric slave cylinder.

DETAILED DESCRIPTION OF THE PREFERRED EMBODIMENT

Figure 1:
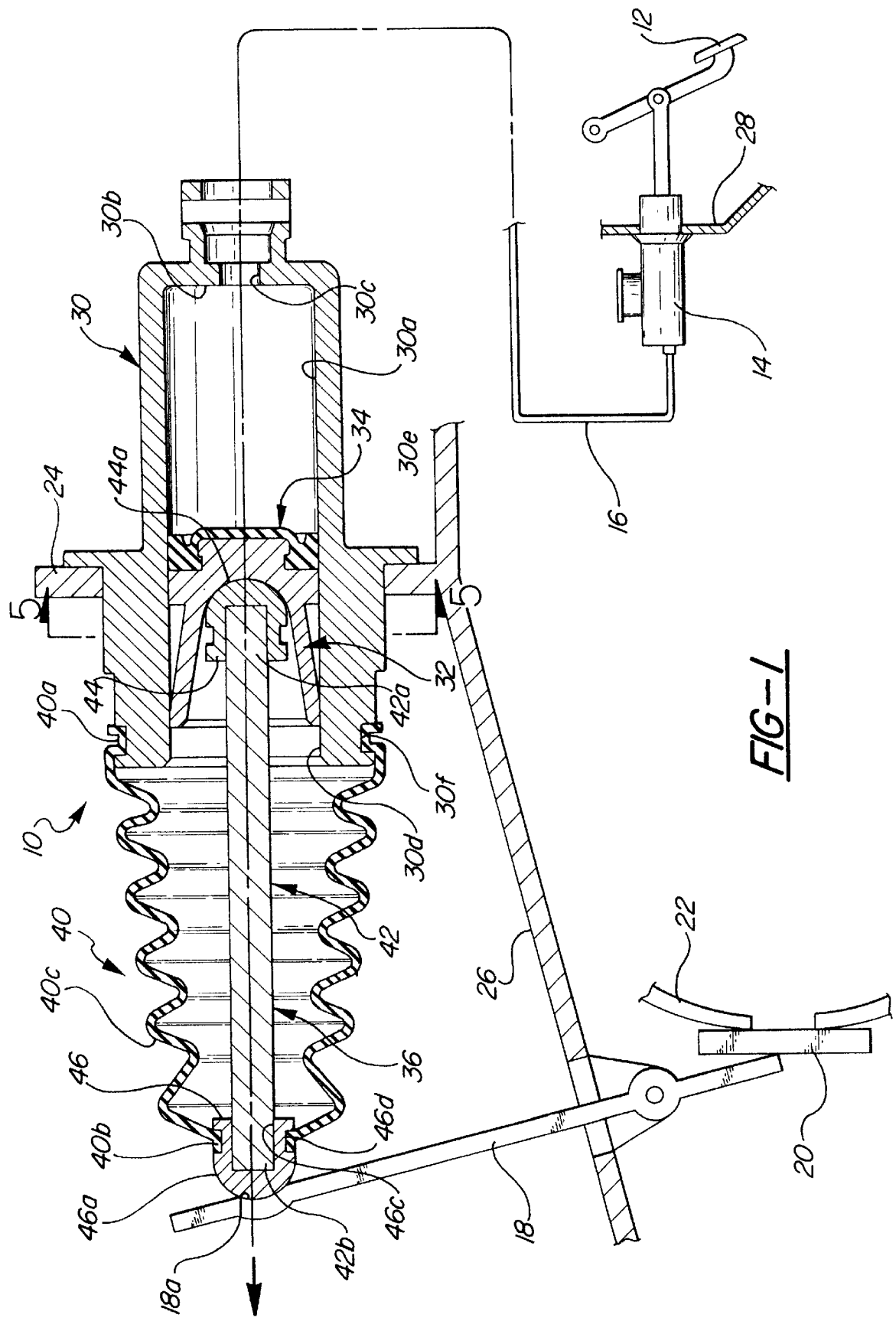
FIG. 1 is a cross-sectional view of a motor vehicle clutch release system employing an external slave cylinder according to the invention.
Figure 2:
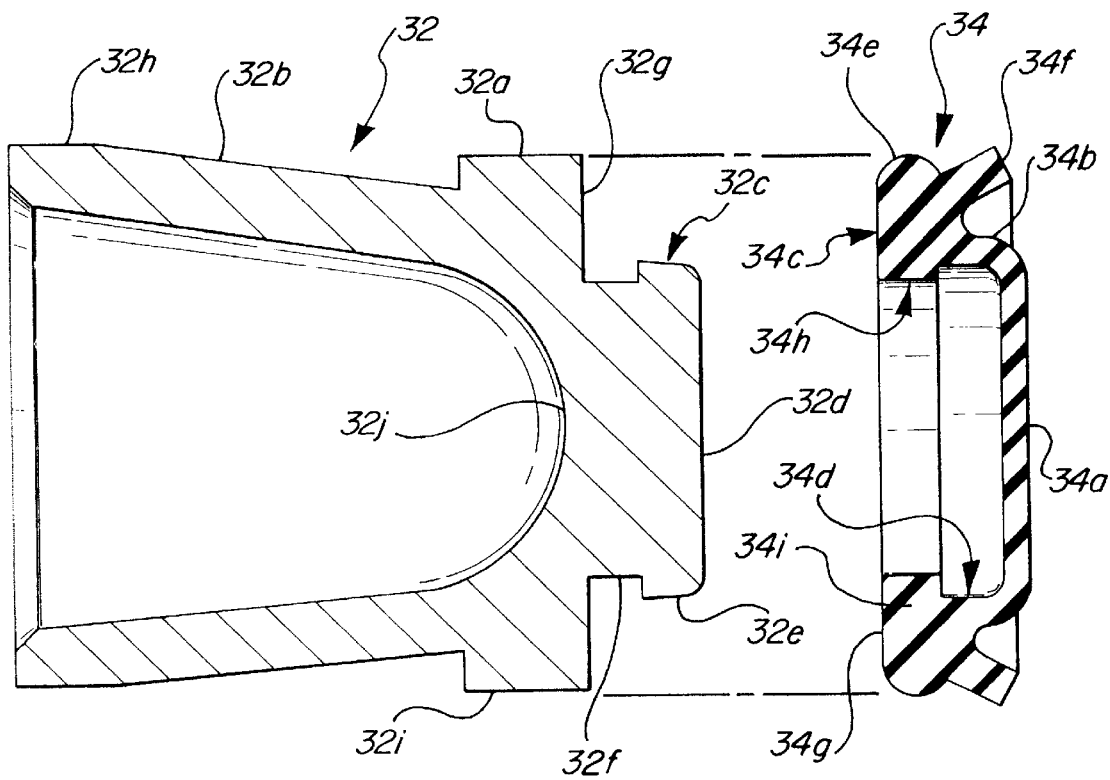
FIG. 2 is a detail exploded view of a piston and seal employed in the slave cylinder of FIG. 1.
Figure 3:
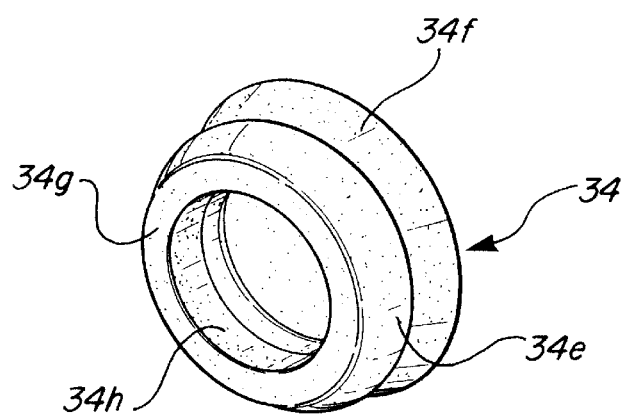
FIGS. 3 and 4 are perspective views of the seal.
Figure 4:
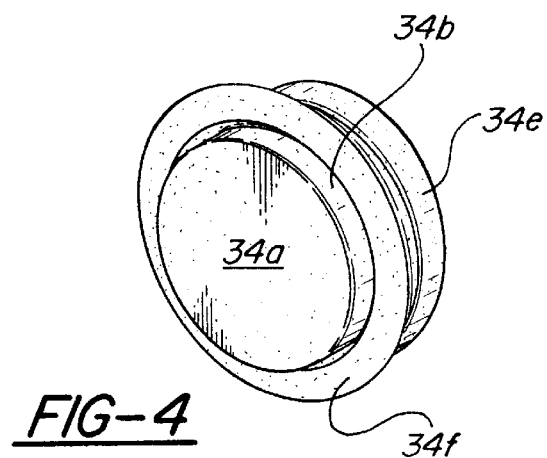

An external slave cylinder assembly 10 according to the invention is seen in FIG. 1 incorporated as a part of a hydraulic motor vehicle clutch release system including a clutch pedal 12, a master cylinder 14, a conduit 16 interconnecting the outlet of the master cylinder with the inlet of the slave cylinder, a clutch release lever 18 actuated by the slave cylinder, a clutch release bearing 20, and the spring fingers 22 of the diaphragm spring of the clutch. It will be understood that depression of clutch pedal 12 displaces pressurized hydraulic fluid from master cylinder 14 which is transmitted by conduit 16 to slave cylinder 10 which extends to pivot release lever 18 and move release bearing 20 against the bias of spring fingers 22 in a direction to disengage the clutch. Slave cylinder assembly 10 is shown mounted on a flange 24 projecting upwardly from the bell housing 26 of the clutch and master cylinder 14 is shown mounted on the firewall 28 of the motor vehicle.

Slave cylinder assembly 10 includes a cylinder body member 30, a piston 32, a seal 34, a pushrod assembly 36, and a spring boot 40.

Body member 30 defines a cylindrical bore 30a having a closed front end 30b through which pressurized fluid is delivered from the master cylinder via a port 30c and an open rear end 30d. Body 30 further defines an annular seat 30f proximate the rear end of the body member and in surrounding relation to bore 30a. Body 30 further includes a flange 30e to facilitate mounting of the slave cylinder such as, for example, on flange 24. Body member 30 may be formed of a suitable rigid material such as a suitable plastic.

Piston 32 is slidably received in bore 30a and has a general diameter corresponding to the diameter of bore 30a. Piston 32 includes a main body cylindrical portion 32a, a conical hollow tail portion 32b, and a nose portion 32c projecting centrally forwardly from main body portion 32a.

Nose portion 32c includes a front face 32d, an annular side wall 32e, and a reduced diameter neck portion 32f. Main body portion 32a defines an annular surface 32g in surrounding relation to nose portion 32c. Annular surface 32g and the front face 32d of the nose portion coact to define a front face of the piston facing the closed end of bore 30a. The piston 32 may be formed of a suitable rigid material such as plastic.

Seal 34 is formed of an elastomeric material, has a rearwardly opening cup configuration, and is sized to fit over the nose portion 32c of the piston. Seal 34 includes a base portion 34a, an annular side wall portion 34b, and a rim portion 34c. Base portion 34a coacts with side wall portion 34b to define a bore 34d. Rim portion 34c defines a heel seal 34e and a lip seal 34f. Rim portion 34c further defines a rear facing annular surface 34g and a counterbore 34h defining an annular radially inwardly extending ridge portion 34i.

Seal 34 is removably positioned against the front face of the piston with the annular side wall portion 34b positioned around annular side wall portion 32e of the piston nose portion, the base portion 34a positioned against the front face 32d of the piston nose portion, the ridge portion 34i positioned within the neck portion 32f of the piston nose portion, and the annular rear face 34g positioned against the annular front face 32g defined on the front end of the piston.

With the piston and seal subassembly installed in bore 30a, cylindrical outer surface 32h of piston tail portion 32b and the outer periphery 32i of the piston main body portion slidably engage the bore and the heel seal 34e and lip seal 34f of seal 34 sealingly engage the bore to preclude leakage of hydraulic fluid rearwardly past the piston or ingestion of air forwardly past the piston into the hydraulic fluid.

Pushrod assembly 36 includes a pushrod 42, a front end cap 44, and a rear end cap 46. Front end cap 44 is positioned on the front end 42a of the pushrod and defines an arcuate forward surface 44a adapted to be seated against a central arcuate surface 32j defined within the hollow of the tail portion of the piston. Rear end cap 46 is fitted over the rear end 42b of the pushrod and defines an arcuate surface 46a fitted within an arcuate surface 18a defined on the upper end of the clutch release lever 18.

Spring boot 40 has a pleated bellows configuration and is formed of an imperforate blow molded thermoplastic elastomeric material such, for example, as Hytrel®, a product of DuPont Chemical. Spring boot 40 includes a forward annular bead 40a positioned in a groove 30f provided in the outer surface of body 30 proximate the rear end of the body and further includes a rear bead 40b positioned in an annular external groove 46d defined by rear cap 46. Spring boot 40 further includes a series of pleats or convolutions 40c extending between front bead 40a and rear bead 40b. Spring boot 40 thus serves as an imperforate protective seal to preclude the entry of dust and other contaminants into the interface between the piston and the bore. Further, spring boot 40 is provided with a configuration and is formed of a material such that it exhibits a desired spring rate so as to provide the desired preload to the pushrod and thereby to the release lever, release bearing and clutch. Spring boot 40 thus serves as both an anti-contaminant seal and a preload spring thereby simplifying the construction of the pressure cylinder, reducing the cost of the pressure cylinder, and obviating the need for any manner of spring in the bore forwardly of the piston.

The invention slave cylinder will be seen to avoid the need for a shipping strap while yet retaining a preload spring in the slave cylinder to eliminate free play between the clutch release bearing, the release lever and the slave cylinder. When the invention slave cylinder is provided in prefilled form the pushrod is extended by the spring but the piston is set in a good position for ease of assembly. When the slave cylinder is fitted to the clutch release system it is necessary to move the pushrod forwardly and compress the spring to allow the rear end cap 46 to be positioned in the pocket 18a of the clutch release lever. However, this operation does not require displacement of hydraulic fluid back through the line 16 and through the master cylinder 14 to the reservoir. Rather, the piston 32 is set in a good position for ease of assembly and, specifically, is positioned within the bore 30a in forwardly spaced relation to the front end of the pushrod so that the forward movement of the pushrod to compress the boot spring 40 and shorten the slave cylinder for mounting against the clutch release lever does not require any displacement of fluid out of the slave cylinder. Rather, the piston maintains its position within bore 30a during this forward movement of the pushrod and compression of the spring boot 40 due to seal friction on the bore 30a. After the slave cylinder has been installed in the manner described, a few strokes of the clutch pedal 12 is all that is necessary to adjust the slave piston into contact with the front end of the pushrod and provide normal operation of the clutch release assembly.

The position of the pushrod in FIG. 1 is an extended position in which clutch 12 has been depressed to move hydraulic fluid from the master cylinder to the slave cylinder to extend the piston and pushrod rearwardly and pivot clutch release lever 18 in a clutch disengaging direction. As the pushrod extends rearwardly, boot spring 40, which has been compressed to enable fitting of the slave cylinder to the clutch release system, is allowed to expand and relax but is moved to a compressed preload condition as the clutch pedal is released to reengage the clutch so that, with the clutch reengaged, the spring again functions as a preload spring to take up slack in the clutch release system.

During operation of the slave cylinder to achieve clutch engagement and disengagement, seal 34 operates to preclude leakage of hydraulic fluid rearwardly past the seal or leakage of air forwardly past the seal. This preclusion of leakage is achieved by providing a full base cup seal to eliminate the internal leak path between the inner diameter of the seal and the piston. Further, it is desirable for cost reasons to mold the piston in a plastic material such as nylon 6/6 with fiber reinforcement. However, due to the inherent nature of the molding process, small imperfections, sink marks or mold parting lines can occur in the sealing diameter of the piston which, with the usual annular ring seal, can cause leakage or air ingress between the piston and the seal. However, with the full cup seal, such imperfections, sink marks, or mold parting lines do not interfere with the effectiveness of the seal, thereby allowing the low cost plastic molding process to be utilized to form the piston without degrading the performance of the seal.

Figure 6:
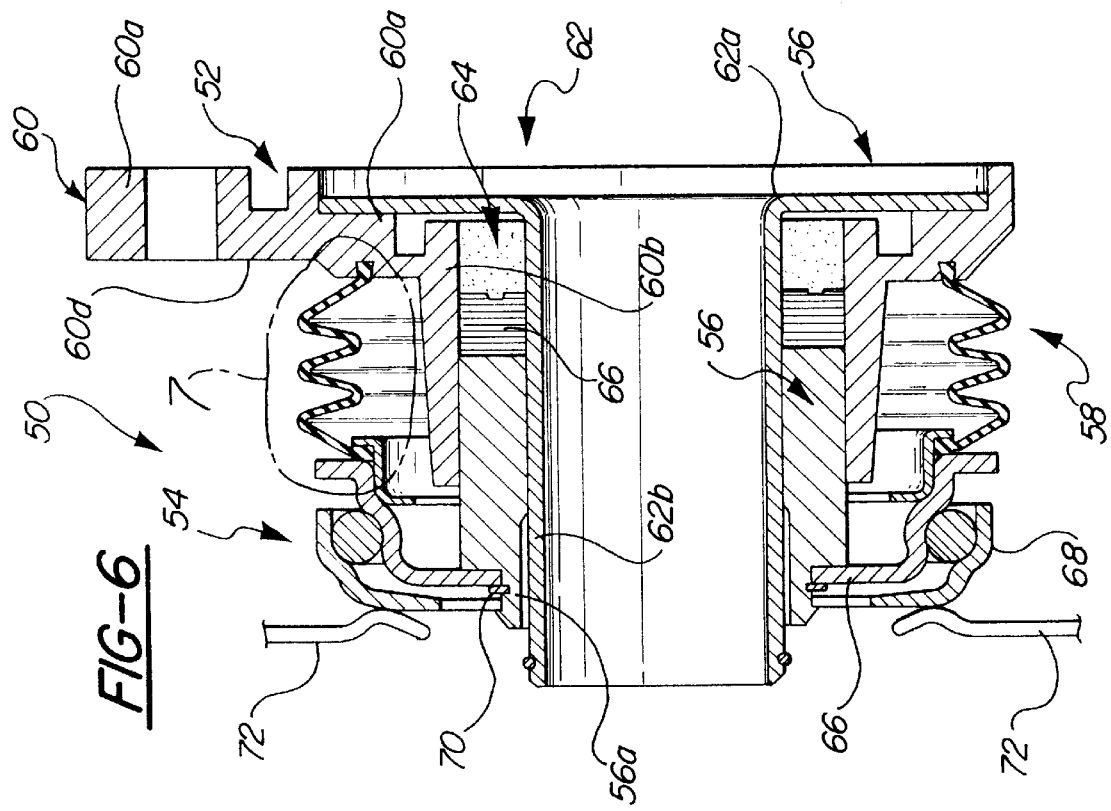
FIG. 6 is a cross-sectional view of a concentric slave cylinder according to the invention.
Figure 5:
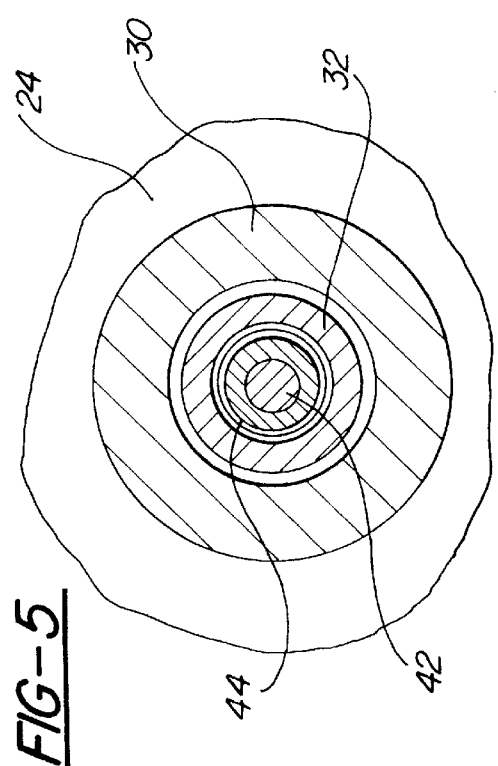
FIG. 5 is a cross-sectional view taken on line 5—5 of FIG. 1.
Figure 7:
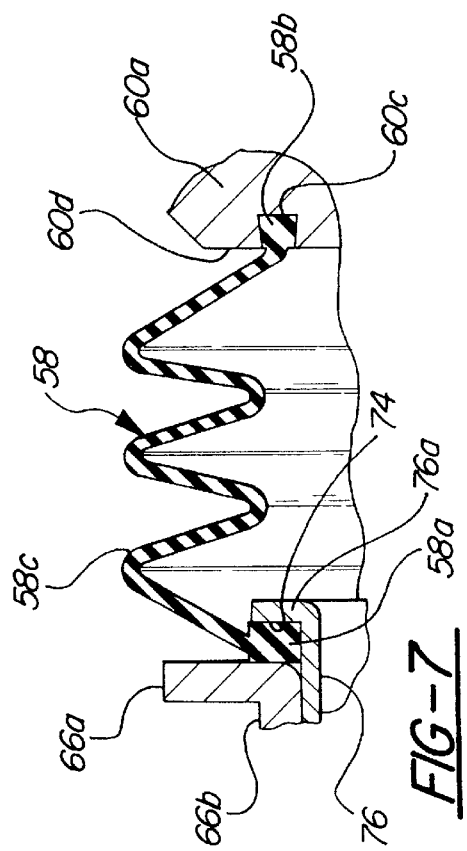
FIG. 7 is a detail view taken within the circle 7 of FIG. 6.

FIGS. 6 and 7 illustrate the application of the features of the invention to a clutch release system employing a concentric slave cylinder 50 rather than the external slave cylinder seen in FIGS. 1–5.

Concentric slave cylinder 50 includes a cylinder body structure 52, a release bearing 54, a piston 56 and a spring boot 58.

Cylinder body 52 includes an aluminum housing member 60 and a steel quill shaft member 62. Housing 60 includes a mounting flange portion 60a and an annular main body portion 60b. Quill shaft member 62 includes a flange portion 62a suitably staked to flange portion 60a of the housing 60 and a central shaft portion 62b coacting with main body portion 60b of housing 60 to define an annular bore 64 therebetween having a front end closed by the flange portion 62a of the quill shaft member 62 and an open rear end.

Piston 56 has an annular configuration and is slidably received in bore 64 with an annular elastomeric seal 65 coacting with the front end of the piston.

Release bearing 54 includes an inner non-rotating race or cage 66, an outer rotating race or cage 68, and a plurality of balls 67 interposed in known manner between the inner and outer races.

Inner race 66 is fixedly mounted on a reduced diameter rear end portion 56a of piston 56 by a snap ring 71. Outer race coacts in known manner with clutch release fingers 72 to engage and disengage the clutch in response to axial movement of the piston in response to introduction and discharge of pressurized fluid into and out of bore 64.

Spring boot 58 has a pleated bellows configuration and is formed of an imperforate blow molded thermoplastic elastomeric material such, for example, as Hytrel®. Boot 58 includes a rear bead 58a, a front bead 58b, and a series of pleats or convolutions 58c extending between front bead 58a and rear bead 58b. Front bead 58b is seated in an annular groove 60c machined in the rear face 60d of flange portion 60a of housing 60 and rear bead 58a is seated in a groove 74 defined between a flange portion 66a of inner race 66 and a flange portion 76a of an annular retainer member 76. Retainer member 76 is welded to the circumferential inner face of an annular body portion 66b of inner race 66 and is positioned in concentric surrounding relation to piston 56.

As with the spring boot 40 of the FIGS. 1–5 embodiment, spring boot 58 serves as a protective shield to preclude the entry of dust and other contaminants into the interface between piston 56 and bore 64 and further serves as a spring device formulated and configured to exhibit a desired spring rate so as to provide the desired preload to the release bearing and clutch. The spring boot thus serves as both an anti-contaminant seal and a preload spring thereby obviating the need for a separate device to provide a preload for the release bearing.

Figure 8:
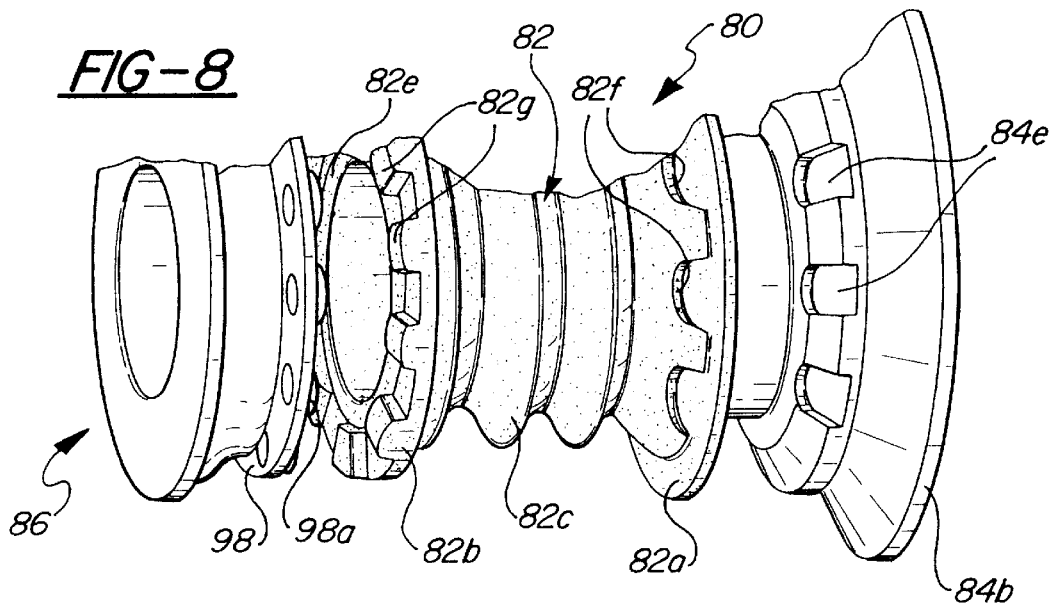
FIG. 8 is a fragmentary exploded perspective view of another embodiment of a concentric slave cylinder according to the invention.
Figure 9:
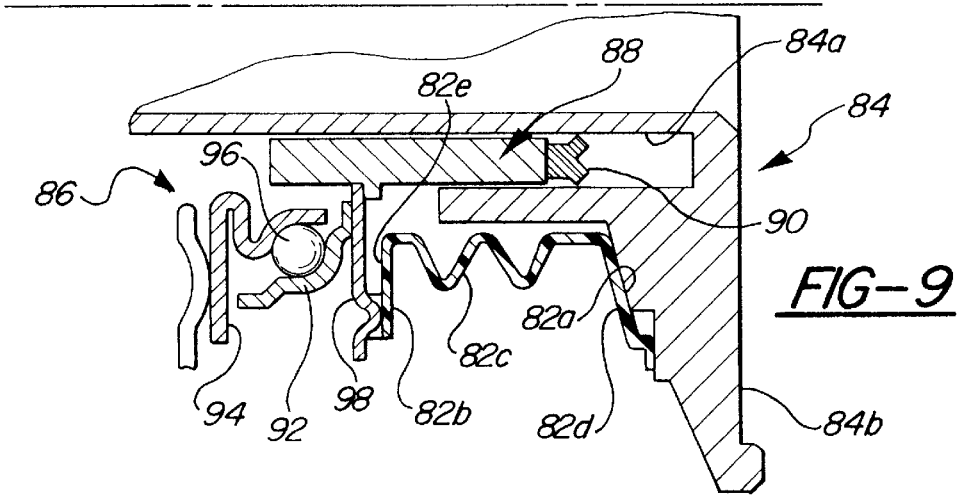
FIG. 9 is a cross-sectional view of the concentric slave cylinder of FIG. 8.

FIGS. 8 and 9 illustrates the application of the invention to a concentric slave cylinder 80 wherein the spring boot 82, in addition to serving as the spring of the cylinder and the dust boot of the cylinder, also serves as an anti-rotation device.

Concentric slave cylinder 80, in addition to spring boot 82, includes a cylinder body structure 84, a release bearing 86, and a piston 88.

Cylinder body 84 defines an annular bore 84a and includes an annular flange portion 84b.

Piston 88 has an annular configuration and is slidably received in bore 84a with an annular elastomeric seal 90 coacting with the front end of the piston.

Release bearing 86 includes an inner non-rotating race or cage 92, an outer rotating race or cage 94, and a plurality of balls 96 interposed in known manner between the inner and outer races. Inner race 92 is fixedly secured as by welding to an annular mounting plate 98 which in turn is fixedly mounted on piston 88 proximate the rear end of the piston.

Spring boot 82 has a pleated bellows configuration and is formed of an imperforate blow molded thermoplastic elastomeric material such, for example, as Hytrel®. Spring boot 82 includes a front flange 82a, a rear flange 82b, and a series of pleats or convolutions 82c extending between front flange 82a and rear flange 82b. Front flange 82a defines a front annular face 82d and rear flange 82b defines a rear annular face 82e. Annular face 82d of front flange 82a defines an annular toothed configuration 82f comprising a series of circumferentially alternating bosses and recesses to define the desired toothed configuration.

Annular cylinder body flange portion 84b defines an annular toothed configuration 84e dimensioned for mating coaction with the toothed configuration 82f on the front annular face of the front flange of the spring boot so that when the front end of the spring boot bears against the flange 84b of the housing the toothed configurations 82f and 84c interlock to preclude relative rotation between the spring boot and the housing.

Rear face 82e of rear flange 82b defines an annular toothed configuration 82g comprising circumferentially alternating bosses and recesses formed in an annular pattern on rear face 82e.

The front face of mounting plate 98 defines an annular toothed configuration 98a comprising circumferentially alternating bosses and recesses configured for mating coaction with the bosses and recesses of the toothed configuration 82g of the rear flange of the spring boot so that, with the rear flange of the spring boot bearing against mounting plate 98, relative rotation between the plate 98 and the spring boot is precluded.

It will be seen that the mating coaction between the front flange of the spring boot and the cylinder housing and the mating coaction between the rear flange of the spring boot and the mounting plate 98, together with the inherent torsional stiffness of the spring boot, has the effect of precluding drag-torque rotation of the inner race 92 of the bearing in response to rotation of the outer race of the bearing. Spring boot 82 thus provides an anti-rotation device to prelude rotation of piston 88 in response to rotation of the outer race on the bearing. Spring boot 82 thus serves as an anti-contaminant seal, a preload spring, and an anti-rotation device.

With respect to the boot seal 40 of the external slave cylinder of the FIGS. 1–5 embodiment, the boot seal 58 of the concentric slave cylinder of the FIGS. 6 and 7 embodiment, and the boot seal 82 of the concentric slave cylinder of the FIGS. 8 and 9 embodiment, it will be understood that the shape of the convolutions, the wall thicknesses, and the material characteristics are all chosen in known manner to provide a desired preload spring rate and a desired hysteresis effect.

Figure 10:
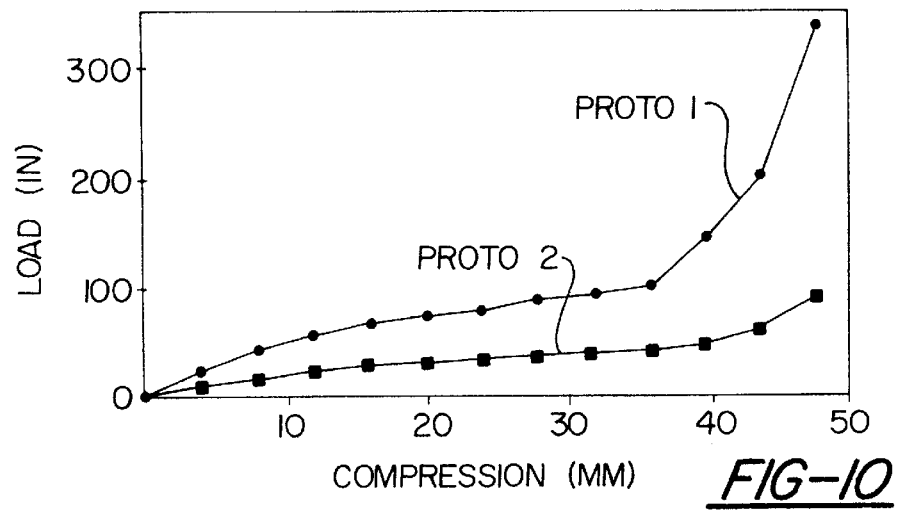
FIG. 10 is a graph showing the relationship of force to deflection for pleated spring boot specimens suitable for use in the invention.

For example, with respect to the spring boot 40 of the external slave cylinder embodiment of FIGS. 1–5, a particularly effective spring boot was formed out of Hytrel® and had a length of 71.8 mm, a small diameter ID of 9.0 mm, and a large diameter ID of 32.2 mm. One prototype specimen of the boot had a wall thickness of 1.14 mm and a second prototype specimen had a wall thickness of 1.28 mm. FIG. 10 is a graph of the deflection in millimeters versus the load in pounds for the two prototype specimens.

Whereas preferred embodiments of the invention have been illustrated and described in detail, it will be apparent that the various changes may be made in the disclosed embodiments without departing from the scope or spirit of the invention.

We claim:

1. A clutch release system for releasing a clutch of a motor vehicle, the system including a piston and cylinder assembly including a cylinder body, a bore defined by the cylinder body, and a piston slidably mounted in the bore; a clutch release bearing; a system spring device providing a spring preload acting against the release bearing; and a boot protecting an interface between the piston and the bore; characterized in that:

the piston and cylinder assembly is devoid of any separate dedicated spring element; and the system spring device and the boot are both constituted by an annular imperforate spring device positioned exteriorly of and in concentric relation to the bore, devoid of any metal spring elements, connected at a front end thereof to the cylinder body, positioned in surrounding relation to the piston/bore interface to preclude the entry of contaminants into the interface, and operative by a rear end thereof to apply the spring preload to the release bearing the system spring device and the boot consisting of a continuous annular sleeve of elastomeric material.

2. A clutch release system according to claim 1 wherein the annular imperforate spring device comprises a pleated boot of elastomeric material.

3. A clutch release system according to claim 1 wherein:

the cylinder body defines an annular bore;

the piston has an annular configuration sized to fit slidably in the annular bore; and the annular imperforate spring device is positioned in surrounding relation to the cylinder body and acts at the rear end thereof against the release bearing.

4. A clutch release system according to claim 3 wherein:

the release bearing is positioned rearwardly and in coaxial relation to the cylinder body and the piston; and the annular imperforate spring device acts at the rear end thereof against the release bearing.

5. A clutch release system according to claim 4 wherein:

the release bearing includes an inner non-rotating race and an outer rotating race;

the inner race is mounted on a rear end of the piston; and the rear end of the annular imperforate spring device acts against an annular structure rigid with the inner race of the release bearing.

6. A clutch release system according to claim 5 wherein the annular imperforate spring device comprises a pleated boot of elastomeric material.

7. A clutch release system according to claim 6 wherein:

the pleated boot includes a front flange having a front annular face and a rear flange having a rear annular face;

the front annular face of the front flange defines an annular toothed configuration;

the cylinder body defines an annular toothed configuration for mating coaction with the toothed configuration on the front annular face of the front flange of the pleated boot;

the rear annular face of the rear flange defines an annular toothed configuration; and the annular structure defines an annular toothed configuration for mating coaction with the toothed configuration on the rear annular face of the rear flange of the pleated boot.

8. A pressure cylinder assembly comprising:

a body member defining a cylindrical bore having a closed front end and an open rear end;

a piston slidably received in the bore;

a push rod having a forward end associated with the piston and projecting out of the open rear end of the bore to position a rear end of the push rod rearwardly of the rear end of the bore; and an annular imperforate spring device positioned exteriorly of the bore in surrounding relation to the rear end of the push rod, connected at a rearward end thereof to the push rod, connected at a forward end thereof to the body member, and operative to apply a preload to the push rod, the bore forwardly of the piston being devoid of any separate dedicated spring element in recognition of the preload supplied by the annular imperforate spring device.

9. A cylinder assembly according to claim 8 wherein the spring device comprises a pleated boot of elastomeric material.

10. A pressure cylinder according to claim 9 wherein the boot includes a rearward end connected to the push rod proximate the rear end of the push rod and a forward end connected to the body member proximate the rear end of the bore.

11. A pressure cylinder assembly comprising a body member defining a cylindrical bore having a closed front end and an open rear end, a piston slidably received in the bore, a push rod having a forward end associated with the piston and projecting out of the open rear end of the bore to position a rear end of the push rod rearwardly of the rear end of the bore, a spring device operative to apply a preload to the push rod, and a protective seal device operative to preclude the entry of contaminants into the piston/bore interface; characterized in that:

the bore forwardly of the piston is devoid of any separate dedicated spring element;

the spring device and the protective seal device are both constituted by an annular imperforate spring device positioned exteriorly of the bore in surrounding relation to the rear end of the push rod, connected at a rear end thereof to the push rod, connected at a forward end thereof to the body member, and operative to apply the preload to the push rod.

12. A cylinder assembly according to claim 11 wherein the imperforate spring device comprises a pleated boot of elastomeric material.

13. A pressure cylinder according to claim 12 wherein the boot includes a rearward end connected to the push rod proximate the rear end of the push rod and a forward end connected to the body member proximate the rear end of the bore.

14. A clutch release system for releasing a clutch of a motor vehicle, the system including a piston and cylinder assembly including a cylinder body, a bore defined by the cylinder body, and a piston slidably mounted in the bore; a clutch release bearing; a system spring device providing a spring preload acting against the release bearing; and a boot protecting an interface between the piston and the bore; characterized in that:

the piston and cylinder assembly is devoid of any separate dedicated spring element;

the system spring device and the boot are both constituted by an annular imperforate spring device positioned exteriorly of and in concentric relation to the bore, connected at a front end thereof to the cylinder body, positioned in surrounding relation to the piston/bore interface to preclude the entry of contaminants into the interface, and operative via a rear end thereof to apply the spring preload to the release bearing;

the system further includes a push rod and a release lever;

the push rod has a forward end associated with the piston and projecting out of an open rear end of the bore to position a rear end of the push rod rearwardly of the rear end of the bore;

the rearward end of the push rod coacts with the release lever to act against the release bearing; and the annular imperforate spring device is positioned in surrounding relation to the rear end of the push rod and is connected at the rear end thereof to the rear end of the push rod.

15. A clutch release system according to claim 14 wherein the annular imperforate spring device comprises a pleated boot of elastomeric material.

* * * * *